United States Patent
Bilgic et al.

(10) Patent No.: US 7,558,352 B2
(45) Date of Patent: Jul. 7, 2009

(54) APPARATUS AND METHOD FOR PREPROCESSING OF PILOT SYMBOLS FOR CHANNEL ESTIMATION BY MEANS OF ADAPTIVE LOW-PASS FILTERING

(75) Inventors: Attila Bilgic, Kirchheim (DE); Robert Denk, Grafing (DE); Holger Neuhaus, München (DE); Michael Speth, Krefeld (DE)

(73) Assignee: Infineon Techologies AG, Munich (DE)

( * ) Notice: Subject to any disclaimer, the term of this patent is extended or adjusted under 35 U.S.C. 154(b) by 734 days.

(21) Appl. No.: 11/111,565

(22) Filed: Apr. 21, 2005

(65) Prior Publication Data

US 2005/0243899 A1    Nov. 3, 2005

Related U.S. Application Data

(63) Continuation of application No. PCT/DE03/03308, filed on Oct. 6, 2003.

(30) Foreign Application Priority Data

Oct. 29, 2002  (DE) .............................. 102 50 361

(51) Int. Cl.
*H04B 1/10* (2006.01)
(52) U.S. Cl. ...................... 375/350; 375/316; 375/340; 370/290; 455/307
(58) Field of Classification Search ................. 375/350, 375/316, 340; 455/213, 307; 370/290, 497
See application file for complete search history.

(56) References Cited

U.S. PATENT DOCUMENTS

| | | | |
|---|---|---|---|
| 6,452,917 B1 * | 9/2002 | Leung | 370/342 |
| 6,580,772 B2 * | 6/2003 | Pajukoski | 375/350 |
| 7,230,975 B2 * | 6/2007 | Subrahmanya et al. | 375/148 |

FOREIGN PATENT DOCUMENTS

| | | |
|---|---|---|
| WO | WO 00/67389 A1 | 11/2000 |
| WO | WO 01/15332 A1 | 3/2001 |
| WO | WO 02/063814 A2 | 8/2002 |

OTHER PUBLICATIONS

"An Adaptive Channel Estimation Scheme for DS-CDMA Systems", Hyuk Jun Oh and John M. Cioffi, VTC 2000, IEEE, vol. 6, Sep. 24, 2000, pp. 2839-2843.
"An Adaptive Filtering Technique for Pilot Aided Transmission Systems", Henry Li and J.K. Cavers, IEEE, May 6, 1990, pp. 507-512.
International Search Report, Int'l Application No. PCT/DE03/03308, Int'l Filing Date Oct. 6, 2003, 3 pgs.

* cited by examiner

*Primary Examiner*—Ted Wang
(74) *Attorney, Agent, or Firm*—Eschweiler & Associates, LLC

(57) ABSTRACT

The invention relates to an apparatus for preprocessing of pilot symbols for channel estimation. The pilot symbols are transmitted from a base station and are received by a mobile radio, and are available in the mobile radio. The apparatus includes a low-pass filter apparatus for filtering the received pilot symbols, with a setting of the low-pass filter apparatus depending on the relative speed of the mobile radio with respect to the base station.

13 Claims, 4 Drawing Sheets

APPARATUS AND METHOD FOR PREPROCESSING OF PILOT SYMBOLS FOR CHANNEL ESTIMATION BY MEANS OF ADAPTIVE LOW-PASS FILTERING

REFERENCE TO RELATED APPLICATIONS

This application is a continuation of PCT/DE03/03308, filed on Oct. 6, 2003, which was not published in English, which claims the benefit of the priority date of German Patent Application No. DE 102 50 361.3, filed on Oct. 29, 2002, the contents of which both are herein incorporated by reference in their entireties.

FIELD OF THE INVENTION

The invention relates to an apparatus and a method in which pilot symbols which have been transmitted from a base station and have been received by a mobile radio, and which are also known to the mobile radio, can be preprocessed by means of adaptive low-pass filtering.

BACKGROUND OF THE INVENTION

In mobile radio systems, the signals propagate in the form of multiple paths whose influence on the signal can be described in the form of a linear time-variant transformation. Signal distortions such as this make correct detection of the data transmitted between the base station and the mobile radio impossible or extremely difficult. For this reason, for example in the case of data transmission which is based on the UMTS (Universal Mobile Telecommunications System) Standard, the channel distortion is estimated with the aid of a pilot signal (Common Pilot Channel; CPICH). The pilot signal is a signal which is transmitted from the base station and by means of which the same pilot symbol or a continuously recurring pattern of two different pilot symbols is transmitted continuously.

In one simple channel model, the symbols $r_k$ which are received by the mobile radio can be mathematically described as follows:

$$r_k = s_k \cdot c_k + n_k \quad (1)$$

In this case, $s_k$ represents the symbols which are transmitted from the base station, $c_k$ a channel parameter and $n_k$ a noise element. The channel parameter $c_k$ describes the rotation stretching of the symbols $s_k$ in the transmission channel. The integer index k indicates the time sequence of the symbols. All the variables in the equation (1) represent complex numbers.

The equation (1) can, of course, also be applied to the transmitted pilot symbols. If the noise element $n_k$ is ignored, then the channel parameter $c_k$ can be determined by multiplying the received pilot symbols $r_k$ by the complex-conjugate known pilot symbols $s_k$. The influence of the transmission channel on the transmitted symbols after their reception in the mobile radio can be eliminated with the aid of the channel parameter $c_k$ obtained in this way, using the equation (1). However, physical effects in the radio frequency receiver mean that the received signals are noisy, so that the channel parameter $c_k$ can be estimated only with finite accuracy.

In order to improve the accuracy of the channel estimate, it is possible to use optimum adaptive algorithms which take account of statistical parameters relating to the transmission channel, such as the correlation between adjacent channel values and noise.

Known channel estimators are essentially based on two principles.

In a first type of channel estimator, no assumptions or ad-hoc assumptions are made about the statistical characteristics of the transmission channel. The complexity of these channel estimators is low since, for example, they can be designed using filters with fixed, complexity-optimized coefficients. However, if the actual channel characteristics differ to a major extent from the assumptions that have been made, the use of fixed estimation coefficients leads to only unsatisfactory results.

A second type of channel estimator is used when the estimation process is subject to stringent quality requirements. These channel estimators are able to set their characteristics adaptively, that is to say the coefficients of these channel estimators are matched to the channel conditions actually present at the respective time. Channel estimators of this type include, for example, adaptive Wiener channel estimators. The method of operation of adaptive channel estimators admittedly leads to good results, but the degree of complexity for adaptive optimization of the coefficients is very high.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

The invention is directed to an apparatus which optimally preprocesses the pilot symbols for channel estimation. The invention also includes a method for preprocessing pilot symbols.

In many instances, the signal-to-noise ratio and the dynamics with which the channel characteristics change must be taken into account for channel estimation. However, the inventors of the present invention have appreciated that the channel dynamics have a considerably greater influence on the results of the channel estimation process than the signal-to-noise ratio. It is therefore possible in some situations to dispense with the need to match the channel estimator that is used to the existing signal-to-noise ratio.

Changes in the channel characteristics over time result in the pilot signal being broadened in the frequency domain. The changes in the channel characteristics over time are caused, in particular, by relative movement of the mobile radio with respect to the base station. In consequence, the pilot symbols which are received by the mobile radio are in the form of a Doppler spectrum in the frequency domain, with a bandwidth which depends on the relative speed of the mobile radio with respect to the base station. This bandwidth is, for example, about 1 kHz in the UMTS Standard for a relative speed of the mobile radio of 500 km/h. The pilot symbol rate is in this case 15 kHz, and is thus considerably greater than the signal bandwidth for all relevant speeds.

The noise that is produced in the receiver is distributed spectrally uniformly over the bandwidth of the pilot signal, and its power can be reduced considerably by low-pass filtering. Ideally, the cut-off frequency of the low-pass filter that is used for the low-pass filtering would be matched to the instantaneous Doppler width of the received pilot symbols. This would result in the relevant information being passed through the low-pass filter without being filtered, while the adaptive noise above the cut-off frequency would be optimally suppressed.

During the low-pass filtering of the pilot symbols, it should be remembered that the low-pass filtering leads to propagation time delays. Without further measures, pure low-pass filtering leads to the channel estimate becoming worse, since the low-pass-filtered pilot symbols which are used for channel estimation are from the past and the channel state has already changed noticeably, depending on the speed. A compromise is therefore found between low-pass filtering and propagation time delay.

The apparatus according to the invention takes account of the channel dynamics by means of filtering of the incoming pilot symbols, with the filtering depending on the measured relative speed between the mobile radio and the base station. In order to filter the pilot symbols which are transmitted from the base station and are received by the mobile radio, the apparatus according to the invention has a low-pass filter apparatus which is set as a function of the relative speed of the mobile radio.

In particular, the low-pass filter apparatus is also set taking account of the signal-to-noise ratio of the pilot symbols at the receiver end.

The setting of the low-pass filter apparatus may, for example, be in the form of setting its filter coefficient or setting a unit for evaluation of the filter pilot symbols. By way of example, it is possible to provide for only a small amount of low-pass filtering to be carried out when the relative speed of the mobile radio is high, in order to cause a short propagation time delay. In contrast, when the relative speed of the mobile radio is relatively low, the propagation time delay is relatively uncritical since the channel changes in this case are very slow, and effective filtering of the pilot symbols is considerably more important.

In consequence, the apparatus according to the invention produces pilot symbols which are optimally preprocessed for the channel estimation process on the basis of the instantaneous relative speed of the mobile radio. Furthermore, the apparatus according to the invention can be implemented with little complexity since the setting of the low-pass filter apparatus is carried out only on the basis of one criterion or a small number of criteria, so that the complexity of the apparatus according to the invention is low.

The actual channel estimation can be carried out by multiplication of the received pilot symbols by the complex-conjugate known pilot symbols, following the low-pass filtering according to the invention. According to equation (1) above and the subsequent text the channel parameter can be calculated by means of this multiplication.

The multiplication described above can also be carried out before the low-pass filtering according to the invention. Overall, there is no difference between the two channel estimation processes that have been mentioned.

For operation of the apparatus according to the invention, it is necessary to measure the relative speed of the mobile radio with respect to the base station. Various measurement methods are known to those skilled in the art for this purpose. For example, the speed can be determined on the basis of the Doppler spectrum of the pilot signal.

According to one embodiment of the invention, a series circuit which comprises two or more series-connected low-pass filter devices is fed with the received pilot symbols. Each low-pass filter unit has a tap at its output for reading the filtered pilot symbols. The filtered pilot symbols are tapped off as a function of the relative speed of the mobile radio with respect to the base station.

In general, it can be said that the further to the rear a low-pass filter unit is arranged in the series circuit according to the invention, the better is the low-pass characteristic of the pilot symbols tapped off at its output, although the greater the propagation time delay is as well, however. Thus, as a rule, the tapping is carried out further forward when the relative speed of the mobile radio is high since, in this case, the propagation time delay should be kept as short as possible. When the relative speed of the mobile radio is relatively low, effective filtering of the pilot symbols is more important, so that the pilot symbols in this case pass through two or more low-pass filter units before being processed further.

The measure described above has the advantage that the individual low-pass filter units need have relatively little complexity and adaptive matching of the apparatus to the existing channel characteristics is nevertheless possible.

The tapping is advantageously carried out at the output of a low-pass filter unit by means of a switching means.

Already known channel estimators are generally equipped with FIR (Finite Impulse Response) filters. However, these filters are relatively complex, not least when they are designed to have the capability to be matched to the channel state. For this reason, considerably less complex IIR (Infinite Impulse Response) filters are preferably used for the low-pass filter units according to the invention.

A further reduction in the complexity of the low-pass filter units is achieved from preferably fixed-set filter coefficients for the low-pass filter units. Furthermore, it is advantageous for this purpose to design the low-pass filter units to be physically identical.

One embodiment of the invention provides for the low-pass filter units to have a normalized group delay time. In particular, the group delay time is normalized to one symbol.

According to a further embodiment of the invention, each low-pass filter unit has two or more series-connected low-pass filters and a multiplier, which is connected in the signal path, for multiplication by a predetermined factor. The multiplication by the predetermined factor allows the amplitude transfer function to be normalized.

In another embodiment, the invention includes a predictor unit. The predictor unit has connections to form two or more taps, and in particular to form all of the taps, which are arranged at the outputs of the low-pass filter units. An estimated value for a subsequent pilot symbol can be calculated on the basis of the pilot symbols which arrive in the predictor unit at the same time. In particular, this may be the pilot symbol which arrives in the apparatus according to the invention at this time. This measure is particularly advantageous when the relative speeds of the mobile radio are high since the finite delay times of the pilot symbols through the low-pass filter units mean that only pilot symbols from the past can be tapped off at the outputs of the low-pass filter units. When the relative speeds are high, a prediction for the pilot symbol that will be valid at the respective time is advantageous, owing to the rapid changing of the channel characteristics.

The predictor unit advantageously calculates the next pilot symbol by means of polynomial extrapolation from the filtered pilot symbols. In one example, the polynomial extrapolation is a linear or square extrapolation.

As an alternative to the series-connected low-pass filter units described above, the low-pass filter apparatus may also be formed by a FIR filter, whose coefficients are variable. The filter coefficients are set on the basis of the criteria that have been mentioned.

The signal transmission between the base station and the mobile radio is preferably based on the UMTS Standard.

A channel estimator according to the invention comprises a calculation unit and an apparatus according to the invention. The calculation unit is used to multiply the received pilot symbols by the complex-conjugate known pilot symbols. As has already been described above, this results in the channel parameter. The apparatus according to the invention is connected either upstream of or downstream from the calculation unit.

The method according to the invention is used for preprocessing of pilot symbols for channel estimation. The pilot symbols to be preprocessed will have originally been sent from a base station, and will have been received by a mobile radio. The pilot symbols transmitted from the base station are known to the mobile radio. For the purposes of the method according to the invention, the received pilot symbols are low-pass filtered by means of a low-pass filter apparatus. In this case, the setting of the low-pass filter apparatus depends on the relative speed of the mobile radio with respect to the base station and, in one example, on the signal-to-noise ratio at the receiver end.

The method according to the invention results in the received pilot symbols being optimally preprocessed for channel estimation. Furthermore, the method according to the invention can be implemented with relatively little complexity.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The invention will be explained in more detail in the following text in an exemplary manner with reference to the drawings, in which.

DETAILED DESCRIPTION OF THE INVENTION

Figure 1:
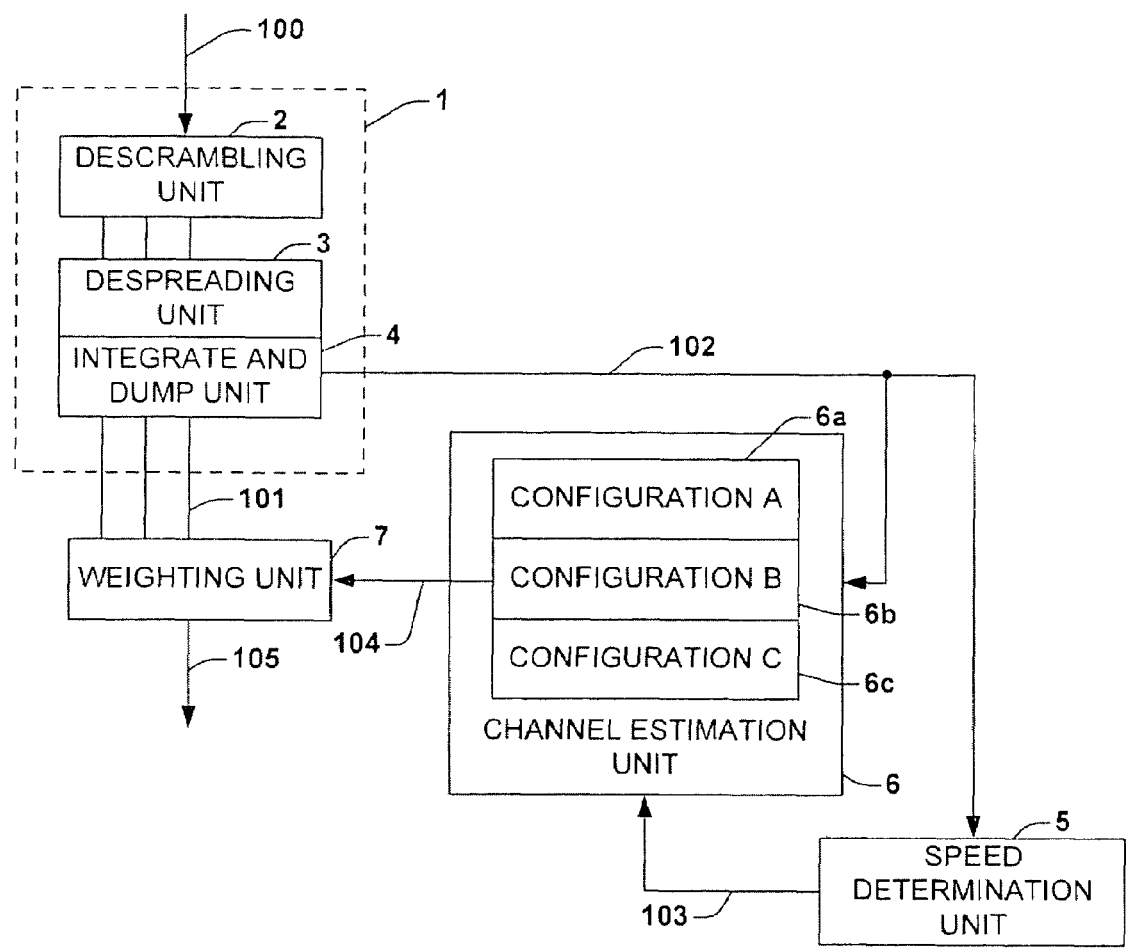
FIG. 1 is a block diagram illustrating one embodiment of the invention, and its implementation in a mobile radio.

FIG. 1 shows, schematically, the principle of the apparatus according to the invention and its inclusion in a mobile radio. In the exemplary embodiments of the invention described in the following text, the data transmission between the base station and the mobile radio is always based on the UMTS Standard.

Chips 100 arriving in a RAKE receiver 1 are passed successively to a descrambling unit 2, to a despreading unit 3 and to an "integrate and dump" unit 4. The chips 100 are converted to symbols 101 in this way. If these are pilot symbols 102 that have been transmitted via the CPICH channel, they are passed to a unit 5 for determination of the relative speed and to a channel estimator 6. The unit 5 is used to measure the relative speed of the mobile radio with respect to the base station. The channel estimator 6 is configured by means of a control signal 103 as a function of the measured relative speed. In this case, by way of example, it is possible to choose between the configurations 6a, 6b and 6c for the channel estimator 6. Two possible refinements of the channel estimator 6 will be described in the following text with reference to two exemplary embodiments of the invention. The two exemplary embodiments are illustrated schematically in FIGS. 2 and 5. In each of its respective configurations 6a, 6b or 6c, the channel estimator 6 calculates a channel parameter 104, which is fed to a weighting unit 7. The channel parameter 104 is used in the weighting unit 7 to remove the distortion caused by the channel from the symbols 101, resulting in symbols 105 which are available for further processing.

Figure 2:
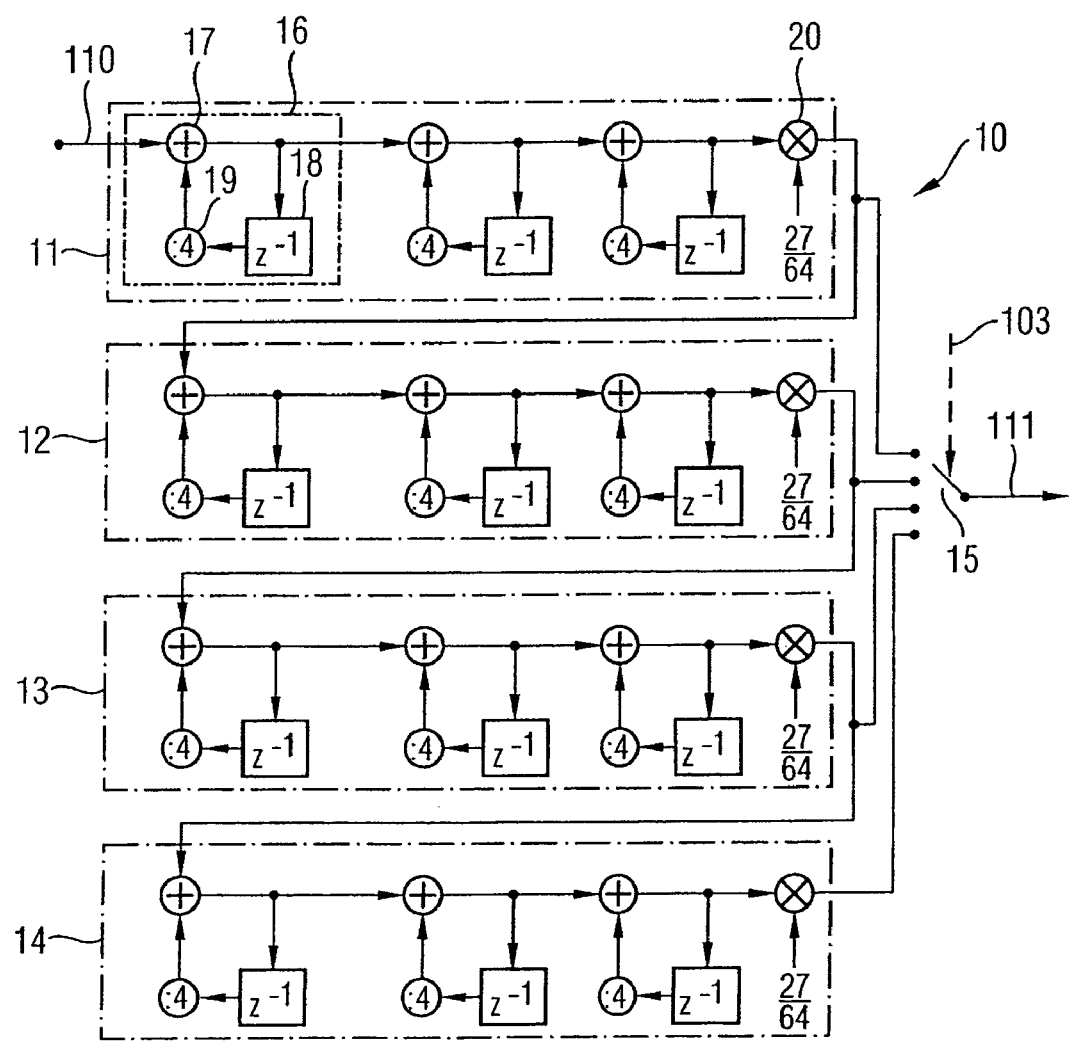
FIG. 2 is a schematic circuit diagram illustrating an exemplary embodiment of the apparatus according to the invention.

FIG. 2 shows the schematic circuit diagram of an apparatus 10 in the form of a first exemplary embodiment of the apparatus according to the invention. By way of example, the apparatus 10 may be integrated in the channel estimator 6 shown in FIG. 1. Four low-pass filter units 11, 12, 13 and 14 are arranged in series in the apparatus 10. On the output side, each of the low-pass filter units 11 to 14 is connected to a changeover switch 15.

Pilot symbols 110 are fed on the input side into the series circuit of the low-pass filter units 11 to 14 as the first low-pass filter unit 11 in this arrangement. The changeover switch 15 is controlled by the control signal 103. Pilot symbols 111 are emitted at the output of the changeover switch 15.

In the present exemplary embodiment, the low-pass filter units 11 to 14 are physically identical. Each of the low-pass filter units 11 to 14 contains three physically identical IIR low-pass filters which are arranged in series.

By way of example, the IIR low-pass filter 16 contained in the low-pass filter unit 11 in FIG. 2 is provided with reference symbols. An adder 17 is connected downstream from the input to the IIR low-pass filter 16. The adder 17 is also fed from a feedback path in which a delay element 18 and a divider 19 are arranged. The divider 19 divides its input value by 4.

A multiplier 20 is connected downstream from each of the three IIR low-pass filters in the low-pass filter units 11 to 14 and applies the factor 27/64 to its input value.

The low-pass filter units 11 to 14 behave like IIR low-pass filters and have the following transfer function $H_{11}, \ldots, _{14}(z)$ in the frequency domain:

$$H_{11,\ldots,14}(z) = \frac{27}{64 - 48z^{-1} + 12z^{-2} - z^{-3}} \tag{2}$$

The coefficients of the transfer function $H_{11}, \ldots, _{14}(z)$ are determined such that the group delay time is 1 symbol, and the in-band gain is 0 dB.

The IIR low-pass filter 16 and all of the other physically identical IIR low-pass filters have the following transfer function $H_{16}(z)$ in the frequency domain:

$$H_{16}(z) = \frac{1}{1 - \frac{z^{-1}}{4}} \quad (3)$$

The multiplication by the factor of $^{27}\!/_{64}$, which is carried out by the multiplier 20, is used to normalize the amplitude transfer function. This factor could also be approximated by the factor $^{32}\!/_{64} = \frac{1}{2}$. In this case, the multiplication could be carried out by means of a simple shift operation.

As has already been mentioned, the group delay time for each low-pass filter unit 11 to 14 is one symbol. When a filtered pilot symbol is tapped off at the output of the low-pass filter unit 11, this accordingly results in this pilot symbol being delayed by one symbol with respect to its arrival time in the apparatus 10. If it is tapped off downstream from the low-pass filter unit 14, the pilot symbol appears delayed by four symbols.

The changeover switch 15 is set by means of the control signal 103. As has already been mentioned in the description text relating to FIG. 1, the control signal 103 is obtained from the measurement of the relative speed of the mobile radio with respect to the base station. The setting of the changeover switch 15 as a function of the relative speed results in the selection of that low-pass filter unit 11 to 14 at whose output the filtered pilot symbols 111 are tapped off. If the relative speed is high, a relatively early tap is chosen in order in this way to keep the propagation time delay of the pilot symbols resulting from the low-pass filtering low. If the relative speed is low, good filtering of the pilot symbols is possible, so that a tap located further downstream is chosen. In consequence, a trade-off must be carried out between effective noise suppression and the tolerable signal propagation time delay, on the basis of the current relative speed of the mobile radio, when the choice of the respective tap is made.

In addition, the signal-to-noise ratio can also be taken into account in the setting of the changeover switch 15.

In order to determine a channel parameter 104, the received pilot symbols must also be multiplied by the complex-conjugate known pilot symbols in accordance with the above equation (1) and the description text following the equation (1). This multiplication can be carried out in the channel estimator 6, upstream or downstream of the apparatus 10.

Figure 3:
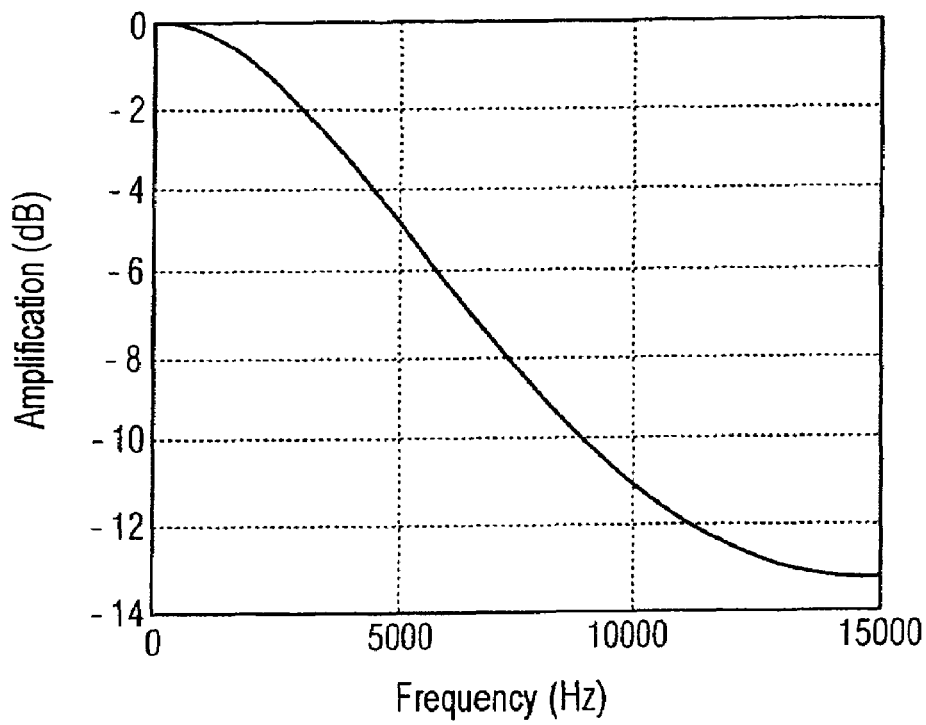
FIG. 3 is a graph illustrating an exemplary transfer function of the low-pass filter units of FIG. 2.
Figure 4:
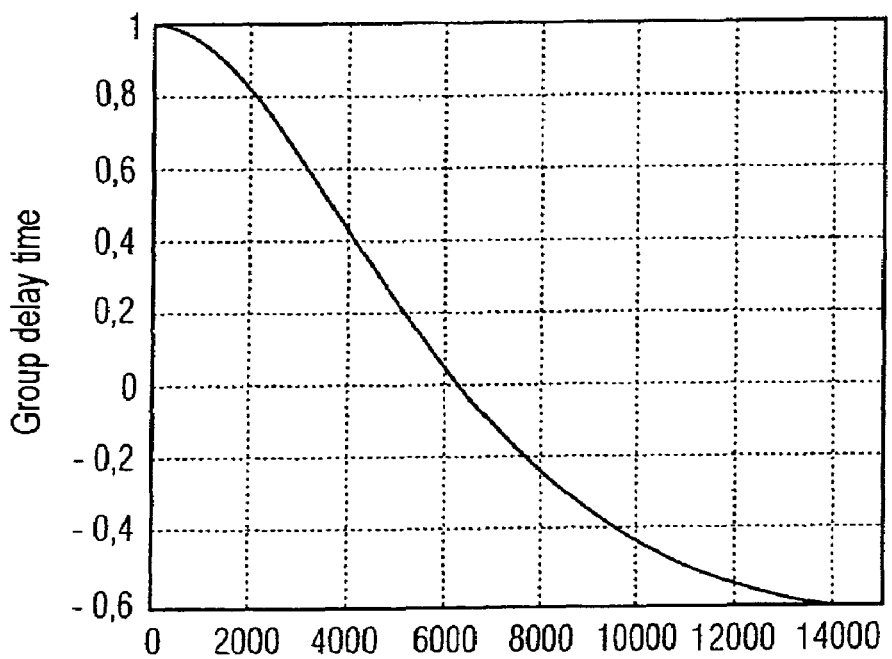
FIG. 4 is a graph illustrating the group delay time of the low-pass filter units of FIG. 2 plotted against the frequency.

FIGS. 3 and 4 show the transfer functions of the low-pass filter units 11 to 14 and their group delay times plotted against the frequency. The 3 dB frequency of the low-pass filter units 11 to 14 is 3.7 kHz. In order to deduce the transfer function for a tap after a number of low-pass filter units from FIG. 3, the transfer function illustrated in FIG. 3 must be exponentiated by the respective number of low-pass filter units.

Figure 5:
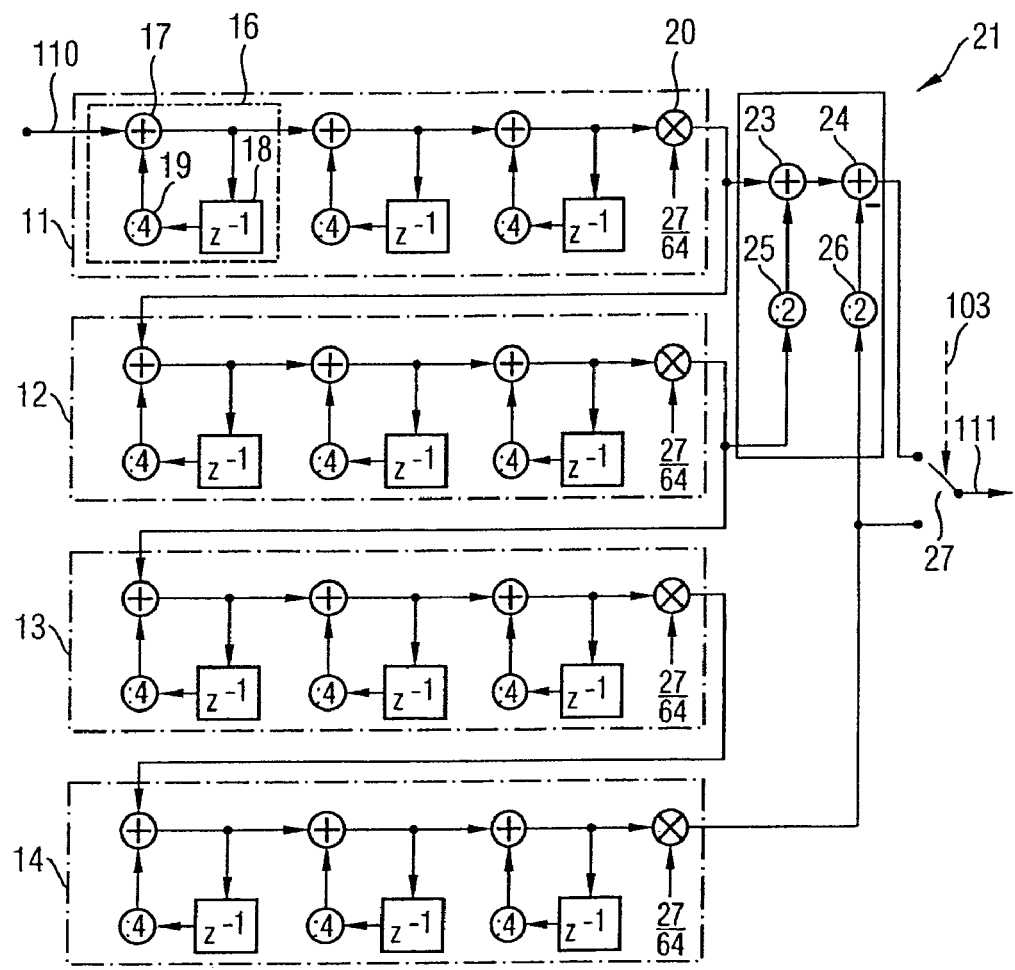
FIG. 5 is a schematic circuit diagram illustrating another exemplary embodiment of the apparatus according to the invention.

FIG. 5 shows the schematic circuit diagram of an apparatus 21 as another exemplary embodiment of the apparatus according to the invention. By way of example, the apparatus 21 may be integrated in the channel estimator 6, as is shown in FIG. 1, in precisely the same way as the apparatus 10.

The apparatus 21 has the same cascaded structure, formed from low-pass filter units 11 to 14, as the apparatus 10. The apparatuses 10 and 21 differ in only a few assemblies. The components of the apparatus 21 which are already known from the apparatus 10 are therefore provided with the same reference symbols.

The apparatus 21 differs from the apparatus 10 by different further processing of the filtered pilot symbols which are produced at the outputs of the low-pass filter units 11 to 14. In the apparatus 21, the outputs of the low-pass filters 11, 12 and 14 are connected to a predictor unit 22. The pilot symbols, which are emitted from the low-pass filter units 12 and 14 at the same time, are divided by two by means of the dividers 25 and 26 in the predictor unit 22. After the division process, the pilot symbols are added by means of the adders 23 and 24 to the pilot symbol which is emitted at the same time from the low-pass filter unit 11, with the mathematical sign of the pilot symbol which is produced by the low-pass filter unit 14 being inverted.

The predictor unit 22 linearly extrapolates the pilot symbols which are emitted from the low-pass filter units 11 to 14. If the current pilot symbol 110, which arrives at the apparatus 21 at an assumed time, is allocated the sequential index N, then the estimated values for the pilot symbols are produced at the same time with the sequential indices N-1, N-2, N-3 and N-4 at the outputs of the low-pass filter units 11, 12, 13 and 14. Using these values, a linear fitting process can be carried out to calculate the straight line which minimizes the square of the distance to the four estimated values. The predictor unit 22 produces the value which the straight line would assume for the sequential index N. The predictor unit 22 thus produces an estimated value for the current pilot symbol 110 at its output.

The extrapolation process that is carried out by the predictor unit 22 depends linearly on the values which are tapped off at the outputs of the low-pass filter units 11 to 14, and thus has the structure of an FIR filter. The values 1, ½, 0 and −½ are obtained for the coefficients of this FIR filter using the parameters that are set in the predictor unit 22. These coefficients can be implemented in a simple manner by means of shift operations.

A changeover switch 27 is used to select the pilot symbols emitted from the predictor unit 22 or the pilot symbols emitted from the low-pass filter unit 14. The control signal 103 is used to control the changeover switch 27.

Since the changeover switch 27 in the apparatus 21 has two poles on the input side, all that is required is a binary decision between low and high relative speeds of the mobile radio. If the relative speeds are low, the tap after the low-pass filter unit 14 is used, while in contrast the output value of the predictor unit 22 is used for high relative speeds.

The apparatuses 10 and 21 illustrated in FIGS. 2 and 5 have high degrees of freedom. Inter alia, the number of speed levels considered, the degree of the extrapolated polynomial and the number of support points used for prediction can be varied and optimized.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. An apparatus for preprocessing pilot symbols for channel estimation, with the pilot symbols having been transmitted from a base station and having been received by a mobile radio, and with the pilot symbols being known to the mobile radio, comprising a series circuit, which is fed by the received pilot symbols, the series circuit comprising two or more series coupled low-pass filter units, with each low-pass filter unit being followed by a tap for reading the filtered pilot symbols, wherein the series circuit is configured to select one of the taps for the filtered pilot symbols based on a relative speed of the mobile radio with respect to the base station.

2. The apparatus of claim 1, wherein the low-pass filter units comprise IIR filters.

3. The apparatus of claim 1, wherein the low-pass filter units each have fixed filter coefficients associated therewith.

4. The apparatus of claim 1, wherein each of the low-pass filter units have the same group delay time which is normalized to a symbol.

5. The apparatus of claim 1, wherein each low-pass filter unit comprises two or more series-connected low-pass filters and a multiplier, which is connected in the signal path, and configured to multiply the filtered pilot symbols by a predetermined factor.

6. The apparatus of claim 1, further comprising a predictor unit which is fed with two or more filtered pilot symbols by means of connections to two or more respective taps, and configured to calculate an estimated value for a next pilot symbol from the two or more filtered pilot symbols.

7. The apparatus of claim 6, wherein the predictor unit is configured to calculate the next pilot symbol by means of a polynomial extrapolation of the tapped-off two or more filtered pilot symbols, with the polynomial extrapolation being a linear or square extrapolation.

8. A method for preprocessing pilot symbols for channel estimation, with the pilot symbols having been transmitted from a base station and having been received by a mobile radio, and with the pilot symbols being known to the mobile radio, comprising:

passing the received pilot symbols through a series circuit having two or more series coupled low-pass filter units, with each low-pass filter unit being followed by a tap for reading the filtered pilot symbols; and selecting one of the two or more taps for the filtered pilot symbols based on the relative speed of the mobile radio with respect to the base station.

9. The method of claim 8, further comprising determining the relative speed of the mobile radio with respect to the base station by evaluating the received pilot symbols at the mobile radio.

10. The method of claim 9, further comprising generating a selection control signal based on the determined relative speed, and selecting one of the two or more taps based on the selection control signal.

11. The method of claim 8, further comprising calculating a channel parameter based on filtered pilot symbols associated with the selected tap.

12. The method of claim 11, further comprising using the channel parameter to remove channel distortion in received data symbols at the mobile radio.

13. The method of claim 8, further comprising employing selective filtered pilot symbols associated with selected taps of the two or more taps to calculate an estimated value for a subsequent pilot symbol and selectively using the estimated pilot symbol value for calculation of a channel parameter based on the relative speed.

* * * * *